Patented June 17, 1952

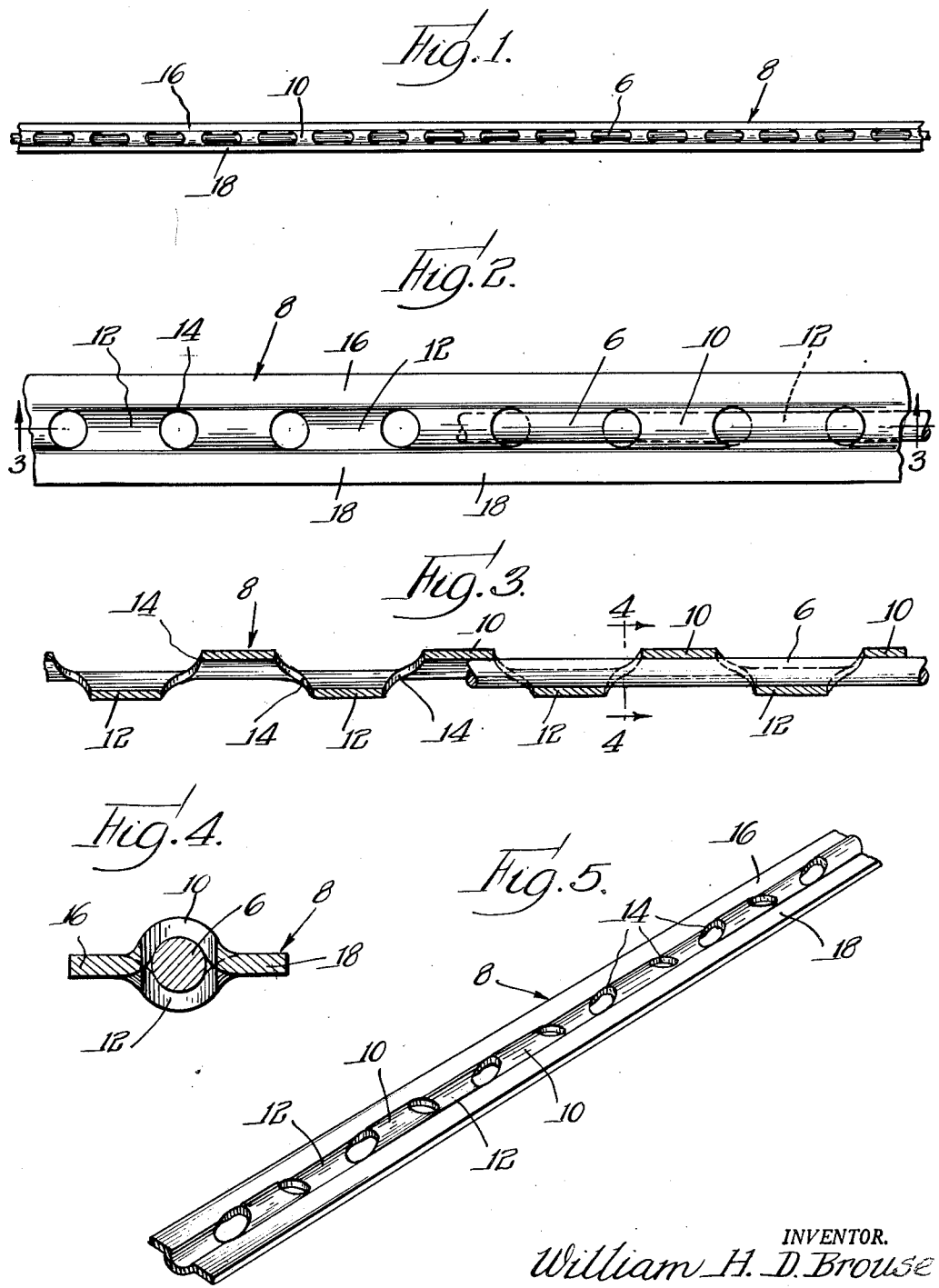

2,601,083

UNITED STATES PATENT OFFICE 2,601,083

FORCE TRANSMISSION APPARATUS

William H. D. Brouse, Toronto, Ontario, Canada, assignor to Teleflex Incorporated, Philadelphia, Pa., a corporation of Delaware Application May 2, 1950, Serial No. 159,615

5 Claims. (Cl. 74—501)

1

This invention relates to mechanical force transmission apparatus and more particularly to elongated mechanical force transmission apparatus of the operating member and guiding conduit type.

Conventional mechanical force transmission apparatus of the foregoing type comprise the well known Bowden wire or so-called rotary shafting in which a stranded or solid wire or other operating member is slidably or rotatably carried within a conduit consisting of a helically coiled wire. This type of construction is quite expensive and is possessed of other disadvantages inherent in the helical coiled wire sheath or conduit.

It has been proposed heretofore to construct a mechanical force transmission apparatus having a conduit formed of sheet metal with apertures formed in the sheet metal and the sheet suitably deformed to accommodate the force transmission member. Certain problems have been encountered in the construction of such sheet metal conduits including the provision of suitable flexibility to the conduit without rendering the conduit highly susceptible to fracture and the provision of suitable support and guiding action by the conduit for the accompanying force transmission member.

This invention comprises generally a mechanical force transmission apparatus of the push-pull or rotary type having a conduit formed of sheet metal. Spaced apertures of circular or other curved configuration are formed in a strip of sheet metal in longitudinal alignment and the sections between adjacent holes are struck out from the surface of the strip, alternate sections being struck in opposite directions, to form a guide channel for a slidable wire or rotary operating member as the case may be. The circular or otherwise curved apertures provide tapered approach guide surfaces leading to arcuate surface contact areas providing a smooth action and support for the operating member over a substantial area and over a substantial portion of its length. The circular apertures progressively decrease the amount of metal in the cross section of the conduit from the start of each aperture to its midposition, thus progressively imparting a greater flexibility to the conduit over each such area and insuring a smooth curve when the conduit is bent rather than a sharp corner at each aperture. The circular apertures eliminate all sharp corners where fracture lines could start and thus materially increase the life of the conduit.

Among the objects of this invention is the provision of an improved elongated flexible mechanical force transmission apparatus of the foregoing type.

Another object of this invention is the provision in a mechanical force transmission apparatus of the push-pull or rotary type of a sheet metal conduit having an improved guiding action.

A further object of this invention is the provision in a mechanical force transmission apparatus of the foregoing type of improved flexibility.

A further object of this invention is the provision in an elongated flexible force transmission apparatus of the push-pull or rotary type of a sheet metal conduit of simple and much less expensive construction than the conventional helical wire conduit of the conventional cable and highly resistant to fracture.

A further object of this invention is the provision in an elongated flexible mechanical force transmission apparatus of the push-pull or rotary type of a conduit of sheet material with adjacent portions displaced in opposite directions from the surface of the sheet to form detents or bands for supporting and guiding a flexible slidable wire or other operating member substantially throughout its length.

A specific object of the present invention is the provision in an elongated flexible mechanical force transmission apparatus of a conduit of sheet material with adjacent portions displaced in opposite directions to form detents or bands for supporting and guiding a flexible wire or other operating member, there being curved apertures formed between adjacent detents to impart improved flexibility to said conduit, to provide tapered approach guide surfaces leading to arcuate surface contact areas, and to eliminate sharp corners subject to fracture.

Other and further objects and advantages of the present invention will be apparent from the following description when taken in connection with the drawings forming a part thereof. In the drawings:

Fig. 1 is a plan view of a section of my mechanical force transmission apparatus drawn to full scale of one embodiment;

Fig. 2 is an enlarged plan view of a portion of the apparatus shown in Fig. 1 with a portion of the wire broken away;

Fig. 3 is a longitudinal sectional view taken substantially along the line 3—3 of Fig. 2;

Fig. 4 is a cross sectional view taken substantially along the line 4—4 of Fig. 3; and Fig. 5 is a perspective view of a portion of the conduit of my mechanical force transmission apparatus.

My invention comprises generally a flexible elongated mechanical force transmission member 6 which may comprise a resilient metallic wire preferably of round cross section or may be formed of plastic or other material of the same configuration or may be formed of stranded metal, plastic, or the like; or particularly in instances wherein rotary motion is to be transmitted may comprise a composite coiled or otherwise formed operating member. The elongated force transmission member 6, which hereinafter will generally be referred to in the interests of simplicity as a wire, is slidably and rotatably mounted in a conduit generally designated as 8. This conduit is formed of a ribbon of sheet material which is laterally flexible and may be of metal, plastic, or other material. The conduit will generally be spoken of hereinafter as comprised of sheet metal, but it is to be remembered that other materials are contemplated.

A longitudinal section of the conduit 8 is displaced from the surface of the ribbon in alternately opposite directions to form detents or bands which preferably are semi-circular in cross section, the upwardly extending bands or strap sections being numbered 10 and the downwardly extending bands being numbered 12. Curved apertures 14 which in the preferred form are substantially circular, are formed between adjacent bands 10 and 12 to impart improved flexibility to the conduit and to avoid overly stressing the metal ribbon as the bands are formed. The curved apertures materially increase the strength and extend the life of the conduit by eliminating any sharp corners where fracture would be likely to start and their curved edges provide tapered guiding surfaces which do not tend to bite into the wire as do straight edges. It is apparent that the curved apertures 14 facilitate the manufacture of the conduit, for round or otherwise curved apertures are readily formed by conventional tools or machines.

It may be seen in the drawings that the longitudinal extent of the bands 10, 12 is considerable compared with the longitudinal extent of the apertures 14. By this means the wire 6 is supported throughout substantially its entire length so that a comparatively flexible wire can be used without danger of its buckling.

The longitudinal displaced section is flanked by longitudinal flanges 16 and 18 on each side of the conduit. These flanges secure the bands 10 and 12 together, define a guide channel along with the bands to support and guide the wire for longitudinal sliding movement or rotary movement, and impart stiffness to the conduit so that it can bend longitudinally only substantially perpendicularly to the surface of the conduit to prevent inadvertent flexing of the conduit in undesirable directions. It is apparent that my force transmission apparatus can be curved in any desired direction for installation by twisting the conduit about its longitudinal axis. The conduit is sufficiently stiff to resist random twisting but is sufficiently pliant to be twisted as desired in installation.

It may be seen that in the force transmission apparatus herein disclosed, the conduit is much simpler and less expensive to manufacture than the usual Bowden cable conduit while the conduit is sufficiently flexible to be installed in practically any position and will withstand considerable flexing. The bands displaced from the surface of the otherwise ribbon-like conduit are of considerable longitudinal extent compared with the apertures between adjacent bands so that the wire carried by the sheath is supported throughout substantially its entire length and over a considerable surface area. The apertures provided between the displaced bands are curved, preferably being substantially circular in configuration. The apertures impart improved flexibility to the conduit and lead to less stress formed in the metal when the bands are displaced from the surface thereof, and the apertures being circular or otherwise curved present no sharp corners at which fractures would be likely to start. Additionally the curved edges of the apertures provide tapered guiding surfaces leading to and from the bands imparting an improved guiding action to the wire.

As noted heretofore it is contemplated that the force transmission member 6 may be solid or stranded and that both this member and the conduit 8 may be of metal, plastic, or other suitable material.

Although a particular form of my invention has been shown and described for illustrative purposes, my invention is not to be limited to this embodiment but is to include all that which fairly falls within the spirit and scope of the appended claims.

I claim:

1. A mechanical force transmission apparatus including a flexible elongated force transmission member and flexible elongated conduit means in cooperative guiding and supporting relation with said force transmission member, said conduit means comprising an elongated laterally flexible strip of sheet material having alternate elongated strap sections therein separated by severance of the portions of the strip therebetween and displaced in opposite directions relative to the strip, said displaced strap sections being substantially longer than the longitudinal extent of severance therebetween for supporting the force transmission member over a substantial portion of the length thereof.

2. A mechanical force transmission apparatus as claimed in claim 1, wherein the strip is apertured to provide the severance between adjacent strap sections with the apertures varying in width longitudinally of the strip.

3. A mechanical force transmission apparatus as claimed in claim 2, wherein the apertures are bounded by curved edges.

4. A mechanical force transmission apparatus as claimed in claim 1, wherein the strap sections are curved in longitudinal cross section to more closely confine the force transmission member.

5. A mechanical force transmission apparatus as claimed in claim 4, wherein the curved strap sections join longitudinally extending flanges along the strip.

WILLIAM H. D. BROUSE.

REFERENCES CITED

The following references are of record in the file of this patent:

UNITED STATES PATENTS

| Number | Name | Date |
|---|---|---|
| 2,129,303 | Douglas | Sept. 6, 1938 |